United States Patent [19]

Podowski

[11] 3,768,019

[45] Oct. 23, 1973

[54] REMOTE CONTROL SYSTEM

[75] Inventor: Robert R. Podowski, Elmhurst, Ill.

[73] Assignee: Zenith Radio Corporation, Chicago, Ill.

[22] Filed: Feb. 2, 1972

[21] Appl. No.: 222,740

[52] U.S. Cl. .......... 325/391, 178/DIG. 15, 318/602, 325/393

[51] Int. Cl. .......... H04b 1/16

[58] Field of Search .......... 318/601, 602; 178/DIG. 15; 325/390, 391, 393

[56] References Cited

UNITED STATES PATENTS

| | | | |
|---|---|---|---|
| 3,155,889 | 11/1964 | Stiles et al. | 318/602 |
| 2,873,439 | 2/1959 | Lahti et al. | 318/602 X |
| 2,798,994 | 7/1957 | Dicke | 318/602 |
| 3,084,315 | 4/1963 | Coady-Farley et al. | 318/601 |
| 3,239,736 | 3/1966 | Gardberg | 318/602 X |

*Primary Examiner*—Benedict V. Safourek
*Attorney*—John J. Pederson and Nicholas A. Camasto

[57] ABSTRACT

A wired remote control system for effecting a plurality of adjustments to a television receiver from a remote location with a minimum number of interconnecting conductors utilizes discrete voltage levels generated within its control head to discriminate between adjustment-functions. A discrete voltage is selected from a voltage divider in the control head for each adjustment-function to be performed, and in the receiver a commutator cyclically selects voltages from a second voltage divider until the locally-selected voltage agrees with the remotely-generated voltage, at which time power is supplied through a second ganged commutator switch to an appropriate actuator for performing the desired function. The elements of the two voltage dividers each comprise series-connected diodes, increasing system reliability and obviating the need for costly precision resistors.

7 Claims, 2 Drawing Figures

REMOTE CONTROL SYSTEM

BACKGROUND OF THE INVENTION

This invention relates to remote control circuits, and more particularly to a wired remote control system for a television receiver.

Aside from the obvious convenience factor, there are numerous situations where it is necessary to control a television receiver, or other appliance subject to frequent adjustment, from a remote location. One such situation exists in hospitals, where a television receiver is often viewed for extended periods of time by people confined to beds, who cannot get up to change channels, adjust volume, etc. In these situations it may be be impractical to use non-wired remote control systems because of possible interference between adjacent receivers or other near-by electronic equipment, or simply because of the higher cost of such wireless systems.

Accordingly, a need has developed for a simple wired remote control system for a television receiver which is economical to construct, and yet which permits adjustment of multiple receiver operating parameters. For obvious reasons of operating convenience, ease of installation, and economy, it is desirable that the size of the interconnecting cable in such a system be kept as small and flexible as possible. This necessitates that the cable have the fewest possible conductors, and it is to a four-wire system for providing multiple operating functions that the present invention is directed.

Accordingly, it is an object of the present invention to provide a new and improved wired remote control system for a television receiver or the like.

It is a more specific object of the present invention to provide an economical remote control system which provides a plurality of operating functions with a minimum number of interconnecting wires.

It is a still more specific object of the present invention to provide a wired remote control system for controlling multiple functions over a minimum number of wires with improved reliability and economy.

In accordance with the invention, a control system for effecting a plurality of adjustments to a television receiver or the like from a remotely-located control head comprises: a first voltage divider contained in the control head and having a plurality of series impedance elements for producing a first plurality of discrete voltages corresponding to assigned ones of said adjustment functions. Means are provided for selecting the discrete voltage corresponding to a desired one of the adjustment-functions, and means comprising a second voltage divider contained in the receiver are provided for producing a second plurality of discrete voltages corresponding to assigned ones of the adjustment functions. A commutator switch is included for cyclically selecting individual ones of the voltages produced by the second voltage divider, and means are provided for comparing the selected voltage from the first voltage divider with the selected voltage from the second voltage divider for producing a control effect when the voltages are substantially identical. Commutating means responsive to the control effect are provided for advancing the commutator switch in the presence of a selected voltage from the first voltage divider until the first and second selected voltages are substantially identical; and utilization means are provided for performing the desired adjustment-function while the first and second selected voltages remain substantially identical.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Figures 1, 2:
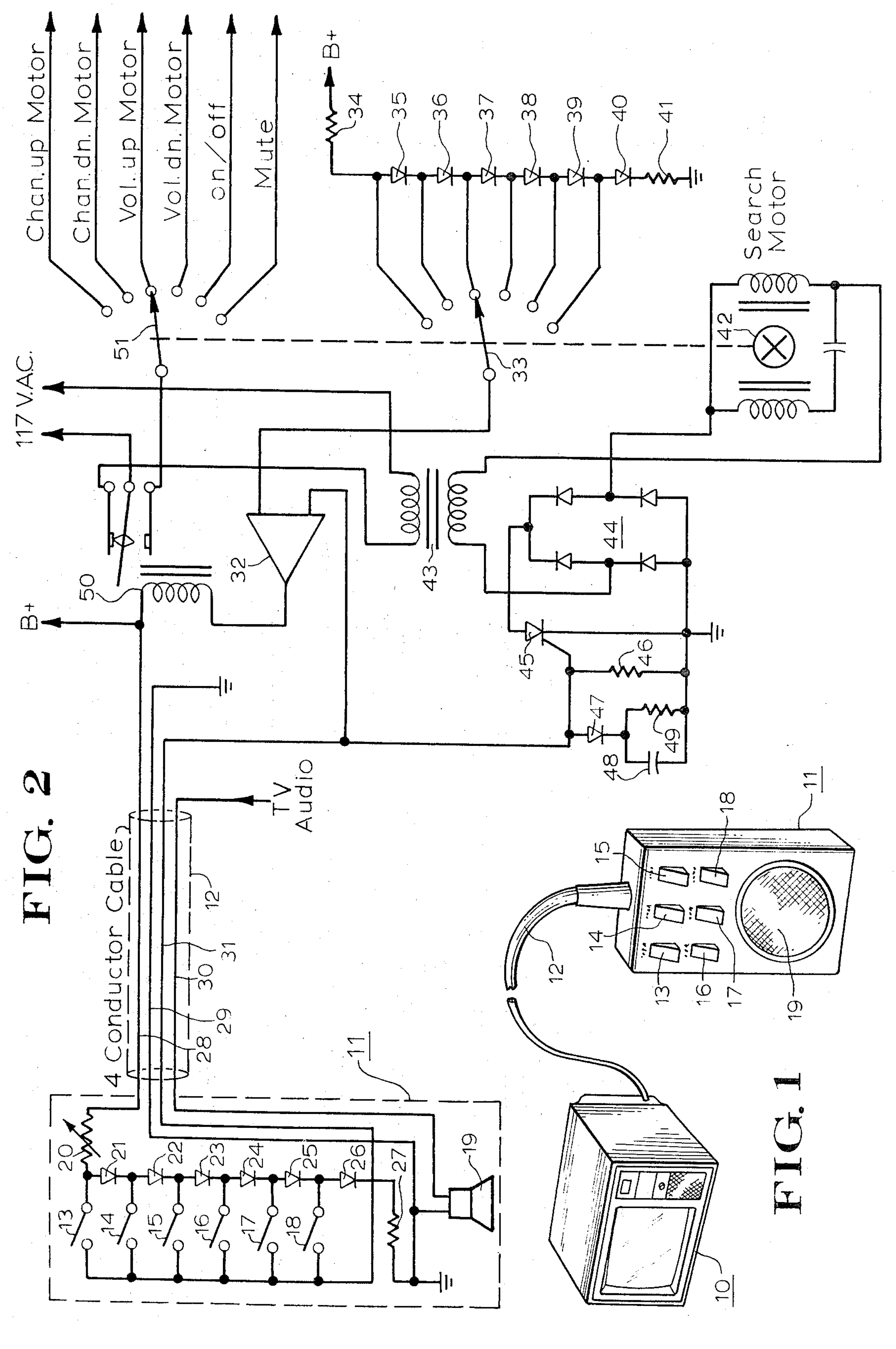
FIG. 1 is a perspective view of a television receiver and associated remote control head embodying the present invention.
FIG. 2 is a schematic diagram of a wired remote control system constructed in accordance with the invention.

Referring to FIG. 1, the system of the present invention is seen incorporated in a television receiver 10, and is further seen to have a remote control head 11 connected to the receiver by a cable 12. Control head 11 contains six actuator switches 13–18, which individually cause assigned ones of six different adjustment-functions, such as increase volume, decrease volume, increase channels, decrease channels, ON/OFF and mute, to be performed in the receiver. These switched are preferably of the momentary contact type, i.e., spring loaded open, and may be interlocked to prevent actuation of more than one switch at a time. A speaker 19 is included in control head 11 for reproducing at the listener's location the audio output signal of the receiver.

Referring to FIG. 2, the circuitry of remote control head 11 is seen to include a voltage divider serially comprising a variable resistor 20, diodes 21–26 and a fixed resistor 27 connected between a conductor 28, one of four conductors in cable 12, and a plane of reference potential, or ground. The ground in control head 11 is joined to the ground in receiver 10 by a conductor 29, another one of the four conductors in cable 12. Speaker 19 has one of its input terminals connected to this ground, and the other of its terminals connected by another conductor 30 in cable 12 to the audio output of the television receiver.

Switches 13–18, illustrated electrically as single-pole single-throw switches in FIG. 2, each have one of their terminals connected to a common conductor 31, which comprises one of the conductors in cable 12 and serves, in a manner to be presently described, as a means for transferring function-indicative voltage signals to the receiver.

In receiver 10 conductor 28 is connected to a source of unidirectional current, the receiver B+ supply of 15 VDC, and conductor 29 is connected to chassis ground. The audio output signal from the receiver is connected to conductor 30. Conductor 31 is connected to one input of a voltage comparator amplifier 32, a type of differential amplifier providing an output only when its inputs are of substantially equal voltage levels. This amplifier may be a commercially available monolithic element such as the Motorola tuning indicator type MC1335P. Other connections for providing operating voltage to the amplifier, such as ground and B+, are not shown for the sake of clarity.

The other input of voltage comparator amplifier 32 is connected to the arm of a six position commutator switch 33, the individual fixed contacts of which are connected to respective ones of the taps of an eight element voltage divider. This voltage divider serially comprises a fixed resistor 34, six diodes 35–40 and a fixed resistor 41 connected between receiver B+ and ground, and like its counterpart in control head 11, provides a discrete output voltage for each possible control function. The first tap of the divider lies between resistor 34 and diode 35, and the last tap between diodes 39 and 40.

The arm of commutator switch 33 is cyclically commutated through its six positions by a split-phase synchronous low-voltage AC search motor 42, which receives its operating power from a step-down transformer 43 and a full-wave bridge rectifier network 44. One terminal of the transformer secondary is connected directly to the motor, which comprises two windings and the phase shift capacitor shown, and the other terminal is connected to the input terminal of the bridge rectifier network. The opposite or output terminal is connected directly to the motor, and the remaining two terminals of the bridge rectifier are connected together through the main electrodes of an SCR 45, so that only when the SCR conducts will alternating current be supplied to search motor 42. This configuration, which allows a unidirectional device like SCR 45 to control full-wave AC current,and does not rectify the alternating current, is well known to the art. The gate electrode of SCR 45 is connected to conductor 31, and to ground by a resistor 46. A time-constant circuit comprising a diode 47 in series with the parallel combination of a capacitor 48 and a resistor 49 is also connected between the gate electrode of SCR 45 and ground.

Power is supplied to the primary winding of transformer 43 from the 117 volt AC line by a circuit serially comprising the normally closed contacts of a relay 50. One terminal of the coil of this relay is connected to receiver B+, and the other terminal is connected to the output of voltage comparator amplifier 32 so that the relay is energized only in the presence of a control effect or output voltage from amplifier 32, representing a matched input condition. The normally open contacts of relay 50 are connected to supply AC power utilization means in the form of a second commutator switch 51, which is ganged to switch 33 and thus simultaneously actuated by search motor 42. The contacts of this switch are connected to individual 117 VAC actuators for performing the various adjustment functions, as indicated in FIG. 2. These may take the form of relays or bi-directional electric motors.

In operation, when the viewer actuates one of momentary contact switches 13–18 on control head 11, a discrete voltage representative of the adjustment function he desires is developed on conductor 31. The voltage developed by each switch is necessarily different because each switch is connected to a different tap on the control head voltage divider. The principal voltage-dropping elements of the divider are silicon diodes because these devices have a uniform substantially current-independent voltage-drop characteristic, and are favorable therefore in the present application even to high-precision resistors, which would be substantially more expensive. Furthermore, as will presently be seen, the use of these devices as voltage references in both the control head and the receiver provides a substantial contribution to system reliability and independence from component drift and aging. In practice, the diodes may be a type 1N645, providing a uniform voltage drop in the divider circuit of 0.65 volts with a nominal current of 10 milliamperes. Variable resistor 20 is included to allow compensation for various cable lengths and expected variations in component characteristics in multiple control head installations.

In the receiver the voltage developed on conductor 31 is applied to one input of voltage comparator amplifier 32, wherein it is compared with the voltage derived for the other input by commutator switch 33 from taps on the receiver-contained voltage divider. This divider is intentionally arranged to provide voltages equal to those appearing on conductor 31 when the commutator switch occupies a position corresponding to the particular function selected at the control head. Of course, it would be possible to construct the divider to provide a higher or a lower voltage, and compensate accordingly by provision of an additional voltage divider at one or the other of the comparison amplifier inputs. When the two inputs compare, an output is produced by comparator amplifier 32 and relay 50 is energized. This removes power from the primary winding of transformer 43 and applies power to the arm of switch 51, and hence to the appropriate actuator motor (or relay) for the particular adjustment-function selected, i.e., corresponding to the particular switch actuated by the viewer and that particular position of the commutator switch. If the two signals do not agree, relay 50 is not energized and transformer 43 remains powered to provide operating current for search motor 42.

The positive-polarity voltage developed on conductor 31 also initiates conduction in SCR 45, causing current to be applied to search motor 42. This in turn causes switches 33 and 51 to rotate advance, and the rotation continues until switch 33 contacts a tap on its associated voltage divider having a voltage level equal to the applied voltage level on conductor 31, at which time relay 50 is energized and power is removed from transformer 33. The search cycle may require from 15 to 300 milliseconds, depending only on the physical characteristics of the motor and switches 33 and 51 and the number of functions to be covered. A clutch arrangement for immediately disengaging the motor upon removal of power is contemplated.

Once power is interrupted, conduction in SCR 45 is terminated and that device will not conduct again until application of another control voltage to its gate electrode. The network comprising diode 47, capacitor 48 and resistor 49 is provided to delay the turn-on time of SCR 45 sufficiently to permit a comparison by amplifier 32 (and actuation of relay 50 should the comparison indicate unequal voltages). Specifically, capacitor 48 must be at least partially charged by the control voltage before sufficient current can flow into the gate electrode of SCR 45 to initiate conduction. Diode 47 allows charging of capacitor 48, but prevents the charge on that capacitor from affecting the turn-off time of SCR 45. Resistor 49 serves to discharge capacitor 48 following an adjustment-function, and resistor 46 provides a current drain for the gate electrode to prevent mis-firing of the SCR under open-circuit conditions.

Once the search motor has commutated switches 33 and 51 to the correct position and the search cycle has been terminated by the energization of relay 50, 117 VAC line current is applied through switch 51 for as long as the particular actuator switch in control head 11 is actuated. When the switch is released, voltage comparator amplifier 32 again senses a difference in input voltage levels (since the voltage level on conductor 31 is zero) and allows relay 50 to be de-energized. This removes line current from switch 51 and the selected actuator, and re-applies power to transformer 43. However, since SCR 45 has become non-conductive by virtue of the interruption of voltage on conductor 31, search motor 42 does not run and the commutating switches remain in their terminal position until another actuator switch is pressed and the search cycle begins anew.

It will be appreciated that commutator switches 33 and 51, while shown here as mechanical rotary-type ganged switches, may alternatively be electronic switching arrangements, and search motor 42 may be replaced by an appropriate electronic commutating arrangement.

Thus, a novel wired remote control system has been shown for reliably performing a number of adjustment functions to a television receiver from a remote location with a minimum number of interconnecting wires. Because of its simplicity and reliability, the system is especially well suited for use in hospitals and other institutions where large numbers of systems must be used in close proximity. The novel use of diodes as voltage divider elements enhances the system's reliability and economy of construction.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a control system for a television receiver including utilization means for individually adjusting the operable functions thereof; a remote control head, connected by a cable to the receiver, having a plurality of switching means corresponding, respectively, to said utilization means for controlling said functions over a pair of conductors in said cable; wherein activation of said switching means results in both selection and adjustment to the viewer's satisfaction of the desired function, comprising:

a first voltage divider contained in said control head and having a plurality of series impedance elements for producing a first plurality of discrete voltages, corresponding respectively to said desired functions, in response to activation of said switching means;

a second voltage divider contained in said receiver and having a plurality of series impedance elements for producing a second plurality of discrete voltages corresponding respectively to said desired functions;

a first commutator switch for cyclically selecting individual voltages produced by said second voltage divider;

comparison means for comparing the voltage from said first voltage divider with the voltage from said second voltage divider and for producing a control effect related to the magnitudes of said voltages;

commutating means responsive to said control effect for advancing said first commutator switch until the magnitude of said first and second voltages bear a predetermined relationship;

and utilization means including selection means coupled to said commutating means for selecting said desired function, and means for performing said desired function during continued activation of said switching means.

2. A control system as described in claim 1 wherein the plurality of series impedance elements in said first and second voltage dividers consists of diodes.

3. A control system as described in claim 2 wherein said diodes are silicon diodes.

4. A control system as described in claim 1 wherein said selection means in said utilization means includes a second commutator switch advanced by said commutating means.

5. A control system as described in claim 2 wherein said predetermined relationship is met when the magnitudes of said corresponding voltages are equal.

6. A control system as described in claim 5 wherein the connecting cable includes an additional wire for applying a source of voltage to said first voltage divider.

7. A control system as described in claim 1 including a speaker contained in said control head; and an additional wire in the cable connecting said speaker to said receiver.

* * * * *